Figure 1:
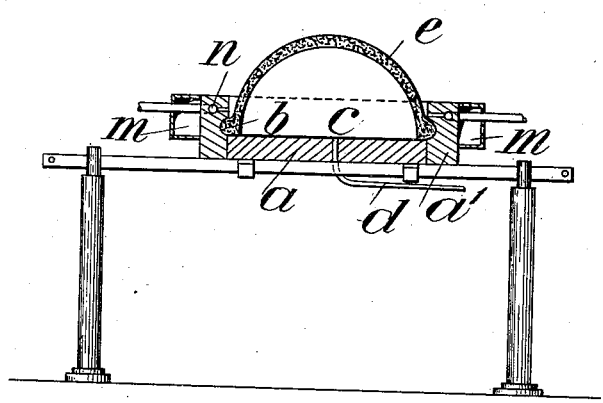

No. 742,506. PATENTED OCT. 27, 1903.
P. T. SIEVERT.
PROCESS OF MANUFACTURING HOLLOW GLASS ARTICLES.
APPLICATION FILED FEB. 20, 1903.
NO MODEL.
4 SHEETS—SHEET 1.

WITNESSES:
W. M. Avery
A. H. Davis

INVENTOR
Paul Theodor Sievert
BY
Munn
ATTORNEYS

No. 742,506. PATENTED OCT. 27, 1903.
P. T. SIEVERT.
PROCESS OF MANUFACTURING HOLLOW GLASS ARTICLES.
APPLICATION FILED FEB. 20, 1903.
NO MODEL. 4 SHEETS—SHEET 2.

No. 742,506. PATENTED OCT. 27, 1903.
P. T. SIEVERT.
PROCESS OF MANUFACTURING HOLLOW GLASS ARTICLES.
APPLICATION FILED FEB. 20, 1903.
NO MODEL. 4 SHEETS—SHEET 3.

WITNESSES:
W. M. Avery
A. C. Davis

INVENTOR
Paul Theodor Sievert
BY
Munn
ATTORNEYS.

No. 742,506. PATENTED OCT. 27, 1903.
P. T. SIEVERT.
PROCESS OF MANUFACTURING HOLLOW GLASS ARTICLES.
APPLICATION FILED FEB. 20, 1903.
NO MODEL. 4 SHEETS—SHEET 4.

WITNESSES:
W. M. Avery
A. H. Davis

INVENTOR
Paul Theodor Sievert
BY
ATTORNEYS.

No. 742,506. Patented October 27, 1903.

UNITED STATES PATENT OFFICE.

PAUL THEODOR SIEVERT, OF DRESDEN, GERMANY.

PROCESS OF MANUFACTURING HOLLOW GLASS ARTICLES.

SPECIFICATION forming part of Letters Patent No. 742,506, dated October 27, 1903.

Application filed February 20, 1903. Serial No. 144,290. (No specimens.)

*To all whom it may concern:*

Be it known that I, PAUL THEODOR SIEVERT, a subject of the German Emperor, residing at Dresden, in the Kingdom of Saxony, Germany, have invented a new and Improved Process for the Manufacture of Hollow Glass Articles, of which the following is a full, clear, and exact description.

The object of the invention is to provide a new and improved process for the manufacture of glass articles, such as sheet or window glass or vessels of cylindrical or other shape, whereby a perfectly-uniform distribution of the glass material in regard to the thickness of the walls of the articles is obtained.

My invention relates principally to improvements in the process for the manufacture of hollow articles, from which articles sheet or window glass may be made, in which process the melted mass is spread upon a table, held firmly at its outer rim, preliminarily blown into a convenient shape either in the open air or in a suitable mold, and then further blown out to any desired size, shape, and thickness, whether for the purpose of eventually slitting and spreading the resulting hollow body into one or more sheets or for the purpose of forming vessels of cylindrical or other shape without such opening and spreading.

I may remark, preliminarily, that there are already known processes in which there are produced glass cylinders from which glass sheets are eventually made by spreading melted glass in a thin layer upon a perforated table or slab and while holding it thereon by means of a frame blowing it out either unconfined in the open air or confined in molds; but in blowing very long and thin glass bodies in this manner a perfectly even distribution of the material, especially as regards the thickness of the walls, is not always attainable. The melted glass has the tendency, especially at high temperature, to run toward the lower portion of the cylinder or other hollow object, and where large bodies, such as cylinders for sheet-glass, are blown in the open air there is frequently in addition an undesired ballooning or bellying of the sides. The herein-described invention does away with these objections in that the melted glass is first blown in a preliminary mold, forming a hollow object of cylindrical or other shape which has projections that enter into and hold fast to depressions in the bottom of the said preliminary mold and which hollow object may then be further and finally expanded and extended by gas or air pressure to the desired shape. This process is facilitated by providing for the separating of the finished article from the mold by first resoftening the glass rim or border by which it is held at one end and then rotating the other end of the article, by which means the resoftened glass is locally formed into a rope-like shape and may be severed and a portion removed, as hereinafter explained.

In order to explain this process in detail, I refer to the accompanying drawings, which exhibit an apparatus adapted for carrying it out.

Figure 2:
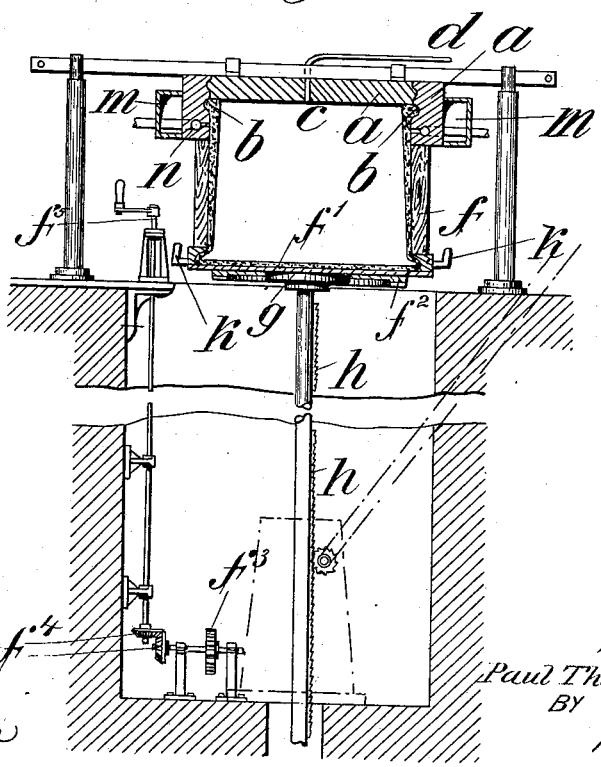
Figure 3:
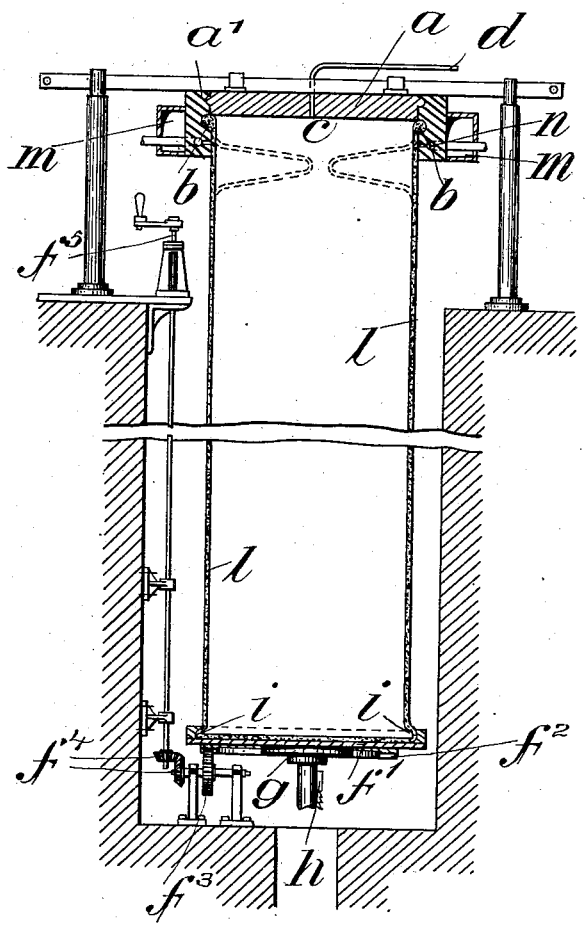
Figure 4:
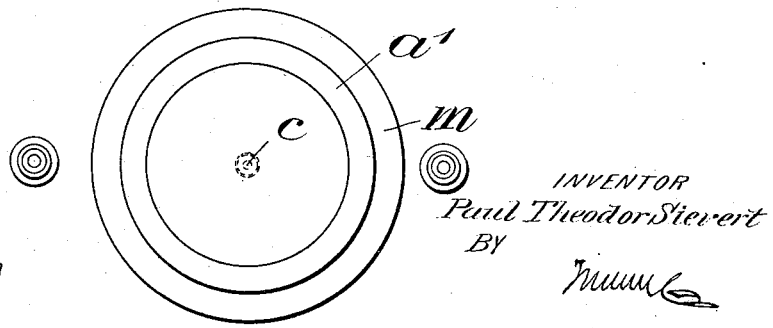
Figure 5:
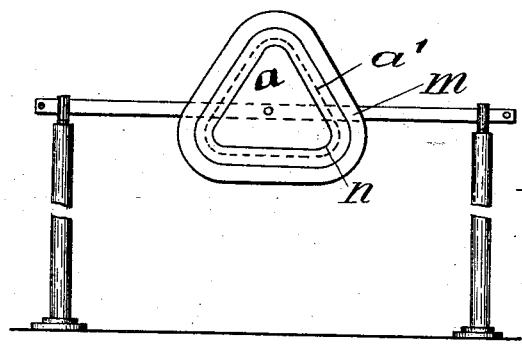
Figure 6:
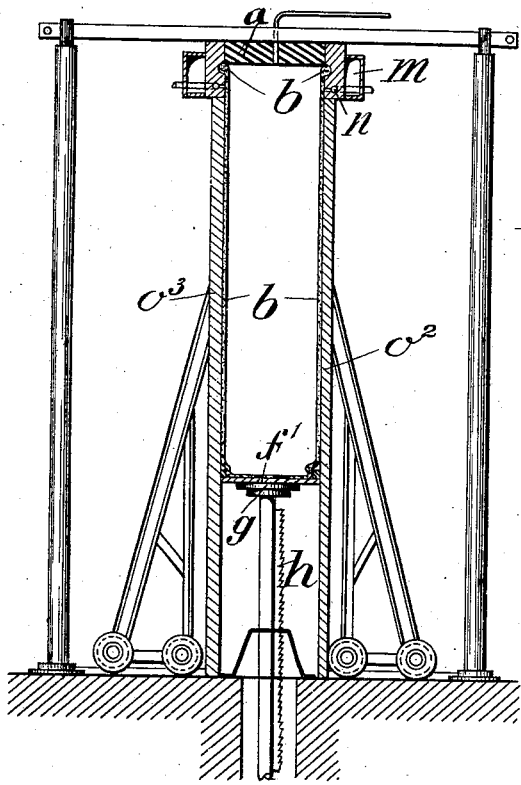
Figure 9:
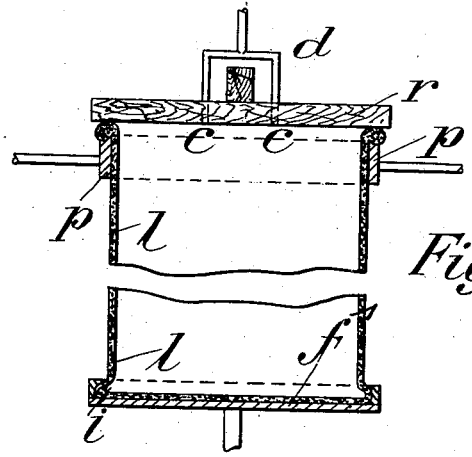
Figure 8:
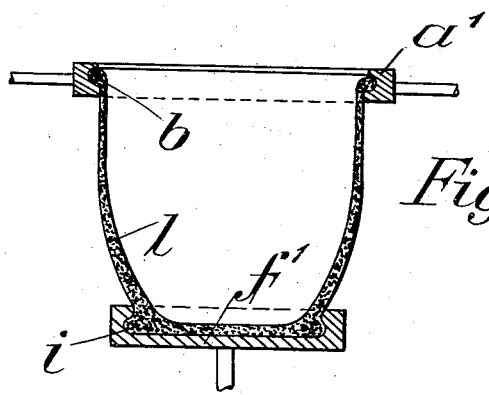
Figure 7:
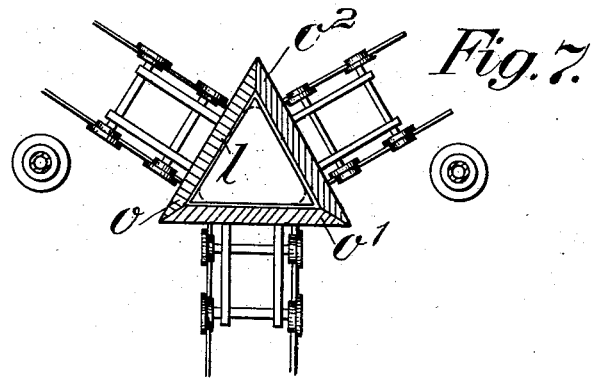

Figure 1 is a sectional side elevation of the apparatus, showing the formation of the flat layer or slab of hot plastic glass into a hollow body. Fig. 2 is a similar view of the same, showing the hollow body connected with the pulling device. Fig. 3 is a like view of the same, showing the parts in a final position. Fig. 4 is a plan view of the apparatus shown in Fig. 1. Fig. 5 is a side elevation of the preliminary mold employed for forming triagular hollow bodies. Fig. 6 is a sectional side elevation of the apparatus for forming triangular hollow bodies. Fig. 7 is a sectional plan view of the same. Fig. 8 is a sectional side elevation of the apparatus for forming vessels, and Fig. 9 is a sectional side elevation of a modified form of the apparatus for forming hollow bodies.

$a$ is a horizontal slab having perforations through its thickness or with open center; $a'$, a frame surrounding this slab; $b$, an annular groove therein; $c$, an orifice for admission of air or gas pressure; $d$, a pipe conveying the air or gas; $e$, a "balloon," cylinder, or other hollow glass body being blown; $f$, a preliminary mold in which this body is formed; $f'$, the bottom of this preliminary mold; $f^2$, a circular rack; $f^3$, a pinion meshing therewith and driving it; $f^4$, miter or bevel wheels on the vertical shaft $f^5$ and on the shaft of the pinion $f^3$; $g$, a horizontal rotatable plate supporting the bottom $f'$ of the mold; $h$, a vertical rack which raises and lowers this latter; $i$, the grooved rim of the bottom $f'$; $k$, detachable handles by which to rotate the bottom $f'$; $l$, the side walls of the cylinder being blown; $m$, a heater surrounding the slab $a$; $n$, a jet gas-burner.

Figs. 1 to 4, inclusive, represent the formation of a hollow glass object in the open air. The melted glass is in this case cast in the usual manner upon a round table or slab $a$ the center of which has an opening. Here it spreads out rapidly and fills the groove $b$, in which it holds fast during the blowing operation. As soon as the glass slab is sufficiently cooled air or gas under pressure is admitted by the pipe $d$ and the hole $c$ for blowing the mass into a cylinder, balloon, or other form. According as it is desired that the bottom of the form thus produced be thick or thin is the balloon or the cylinder $e$ made thicker or thinner. This can easily be regulated by blowing less or more rapidly, the more rapid the blowing the thinner the side walls and the more the glass flows toward the rim of the body $e$, as seen in Fig. 1. The form shown as an example is suitable for the production of a cylinder for sheet-glass, in which there is no special advantage in having a thin bottom, as it is to be split open. As soon as the balloon or other shape has attained a sufficient length it is rotated through an angle of one hundred and eighty degrees about its vertical axis upon the slab $a$, and at the same time the preliminary mold $f$ is firmly held against the borders of the plate $a$, as shown in Fig. 2. This preliminary mold $f$ rests upon the rotatable bottom $f'$, which, as shown, can be raised and lowered by a rack $h$ and corresponding pinion. Not only the side walls of the preliminary mold $f$ but also its bottom $f'$ consist of separate parts, so that they can be opened out sidewise. The bottom $f'$ is held firmly on the plate or slab $g$. Preferably, however, there is a continuous molding around the outer edge, as shown in Fig. 2. As soon as the preliminary mold $f$ is united with the slab or plate $a$ the balloon or body is further expanded by air or gas under pressure until it touches the side walls of the preliminary mold $f$ and completely covers the bottom $f'$. Then the plate $g$ and the preliminary mold $f$ can be rotated about their vertical axis by the handles $k$ in order to prevent the formation of seams or other imperfections in the blown-out article. This rotation is performed where it is desired to make cylinders with smooth outer surfaces. When the preliminary mold is completely filled, its side walls are removed, and the mold-bottom $f'$ is lowered by the rack $h$ and its corresponding pinion. During this lowering the blowing is further continued, the attainment of the desired result being facilitated by the glass being firmly held in the rim $i$ of the mold-bottom $f'$, which renders the distribution of the soft material more even and prevents bellying out of the side walls $l$ of the cylinder.

Where cylinders for sheet-glass are to be made, as shown in Fig. 3 in cross-section and Fig. 4 in ground plan, the glass should be blown as thin as possible in the rim $i$ of the bottom $f'$. There usually results in this case in the blowing operation a spontaneous separation of the glass bottom from the side walls of the article, and if not such separation may readily be accomplished later, thus saving labor and lessening the loss from breakage.

On the frame $a'$ of the slab $a$ there is a heater $m$, kept hot by charcoal or other suitable fuel. This heater has for its object to prevent the temperature of the glass mass on the frame $a'$ from sinking below a given point which would prevent the formation of the blown cylinder or other shape.

In the frame $a'$ there is a burner $n$, which emits pointed flames or jets, preferably of a mixture of air and inflammable gas. This retards the cooling action of the air upon the surface of the glass which lies upon the frame $a'$. There can also be effected during the formation of the glass balloon or cylinder a warming to any desired extent, by means of this burner $n$, of the glass mass upon the frame $a'$ of the slab $a$, and finally the upper border of the completed balloon or cylinder can be so softened that the thick rim in the groove $b$ of the frame $a'$ can be readily cut off by shears or torn off by rapid pulling down. In separating by pulling the plate $g$ and the cylinder can be rotated, this effecting a spiral twisting of the soft upper parts of the cylinder, as shown in Fig. 3 by dotted lines. There results then a cap or upper portion which is connected to the cylinder by a twisted glass thread or rope, which latter can be cut, so as to separate the cylinder from the cap.

The rotation of the disk $f'$, which holds the lower border of the hollow glass object, may be effected by any desirable means. In the manner shown in Fig. 3 the lower side of the disk $f'$ is provided with a circular rack $f^2$, which in the lowest position of the disk meshes with the toothed pinion $f^3$, which latter is actuated by the conical gear-wheels $f^4$ and shaft $f^5$.

When it is desired to make hollow glass vessels by this process, the bottom of the balloon is made thick, and in many cases the rim at the upper edge is not separated.

In Fig. 8 is shown the formation of a vessel that has a bottom of diameter smaller than that of the opening in the vessel, while in the formation of cylinders for making sheet-glass it is always best to give the bottom a diameter like the upper edge of the cylinder. This permits the most favorable distribution of the glass, as the pulling then acts uniformly upon the glass walls.

In Figs. 5 to 7 is shown the application of this process where there is employed a finishing-mold with blowing and pulling operations. There is here to be made a hollow prism of triangular cross-section which is to be cut in the usual manner into three sheets. In this case there is necessary a triangular slab with a hole in the middle, as shown in plan in $a$, Fig. 5. Its corners are suitably rounded. Fig. 6 shows in sectional side elevation, and Fig. 7 in plan, the blowing and pulling of the triangular glass prism in the finishing-mold. This latter mold consists of three parts $o'$ $o^2$ $o^3$, which are brought up to the sides upon wheels and which are withdrawn from the slab $a$ while the melted glass is being cast upon the slab and blown into the preliminary mold. The inner surfaces of the preliminary mold are of metal polished and, where desired, nickel-plated or covered with wet paper. They can, however, consist of plates of polished earthenware or other ceramic material. The glass balloon $e$ necessary to the formation of the hollow triangular glass prism is formed as shown in Fig. 1. The preliminary blowing of this hollow body is effected in a triangular prismatic preliminary mold $f$ in the same manner as shown in Fig. 2; but a rotation of the preliminary mold is in this case not possible. As soon as the preliminary blowing is completed and the side walls of the preliminary mold $f$ removed the parts $o'$ $o^2$ $o^3$ of the finishing-mold are brought up close to the slab $a$, so that together with this they make a closed mold, in which is guided the triangular bottom $f'$, that is held fast on the slab $g$, which latter can be raised and lowered by the rack $h$ and its corresponding pinion. The bottom $f'$ consists of several parts, so that it can be opened sidewise. The preliminary blown-glass body is elongated by lowering the plate $g$, with the bottom $f'$, within the finishing-mold, while at the same time air or gas is blown in. This effects the expansion of the mass until it lies close to all the smooth inner surfaces of the finishing-mold. While the plate or slab $a$ and the bottom $f'$ have rounded corners, the finishing-mold has internally sharp edges, so that the hollow glass triangular prism, which is first formed with rounded edges, is forced by the pressure of the air or gas to assume sharp ones, as shown in Fig. 7. Thus there results such a thinning of the hollow glass prism at the edges that it will either be entirely burst through at these edges or rendered very thin there. The resulting sharp-edged hollow triangular glass prism can therefore very readily be separated into three flat sheets, if not already so separated. The separate sheets are held fast only on the frame $a'$ of the slab $a$ and can be separated therefrom by the action of the burner $n$ in the manner before described. According as the slab $a$, the preliminary mold $f$, with its bottom $f'$, and the finishing-mold are triangular, quadrangular, or polygonal there will be formed at one blowing three, four, or more glass sheets.

In place of a slab $a$ there may be employed, as seen in Fig. 9, a frame $p$, which holds the sheet of soft glass. Upon this frame there may be laid in order to obtain the necessary pressure either a wet cover or an air-tight cover $r$, connected with the air or gas pipes. The cover is made of asbestos.

By this process there may be made glass surfaces with patterns in stripes, ribs, &c. For this purpose the inner surfaces of the preliminary mold $f$ may be made with corresponding patterns in intaglio. In this mold there may be made by above-described process a hollow body having the desired patterns and which may be elongated by blowing and pulling.

It is possible to reverse the entire process as above described by blowing from below upward and elongating the hollow glass body upward instead of downward.

What I claim as my invention, and desire to secure to myself by Letters Patent of the United States, is—

1. The process for the manufacture of hollow glass articles, which consists in depositing a mass of molten glass upon a flat surface to form a sheet; supporting the sheet at its edges and expanding it by gas-pressure into a hollow form in a mold, whereby it assumes the shape of the latter and is attached thereto at the bottom; then removing the side portions or body of said mold; and next lowering the bottom of the mold, and simultaneously continuing the blowing or gas-pressure, substantially as described.

2. The process for the manufacture of hollow glass articles, which consists in depositing a mass of molten glass upon a flat surface; applying heat to the rim of the layer to maintain it plastic; expanding such molten mass by gas-pressure into a hollow form in a mold, whereby it assumes the shape of the latter and is attached thereto at top and bottom; then removing the side portions or body of said mold; and next lowering the bottom of the mold, and simultaneously continuing the blowing or gas-pressure, substantially as described.

3. The process of manufacture of hollow glass articles consisting in depositing upon a slab a mass of molten glass; applying heat to the rim of the same to maintain it plastic; expanding the mass, by gas-pressure, in a mold, whereby it assumes the form of and is attached to the mold at top and bottom; next, rotating the mold, to remove seams and other inequalities in the glass body; then removing the side portions of the mold; and, finally lowering the bottom of the mold and at the same time continuing the gas-pressure within the glass body, as described.

4. The process of manufacture of hollow glass articles, consisting in depositing upon a slab a mass of molten glass; applying heat to the rim of the mass; expanding the mass into a mold; lowering the bottom of the mold and continuing the gas-pressure; then rotating said bottom the top of the glass body being held stationary; and severing the reduced twisted portion of the glass body from the upper portion or cap still held in the upper part of the mold; substantially as described.

5. The process for the manufacture of hollow glass bodies, which consists in depositing a mass of molten glass upon a slab; blowing out the hot mass to form a hollow body; applying heat to the upper portion of the body to maintain it plastic; pulling the hollow body downward to elongate it while the gas-pressure is continued; and then separating the main portion of the body from the head or cap in the area thus maintained plastic; substantially as described.

6. The process for the manufacture of hollow glass bodies, consisting in depositing a mass of molten glass upon a slab; blowing the mass into a preliminary mold; removing the side portion of the latter; then drawing the hollow body into a supplemental finishing-mold, while the blowing is continued to expand the body into the final shape desired.

In testimony whereof I have signed my name to this specification in the presence of two subscribing witnesses.

PAUL THEODOR SIEVERT.

Witnesses:
PAUL E. SCHILLING,
PAUL ARRAS.